Sept. 22, 1959
R. F. MALLINA
2,905,400
WIRE CONNECTING MACHINE
Filed Dec. 31, 1953
7 Sheets-Sheet 1
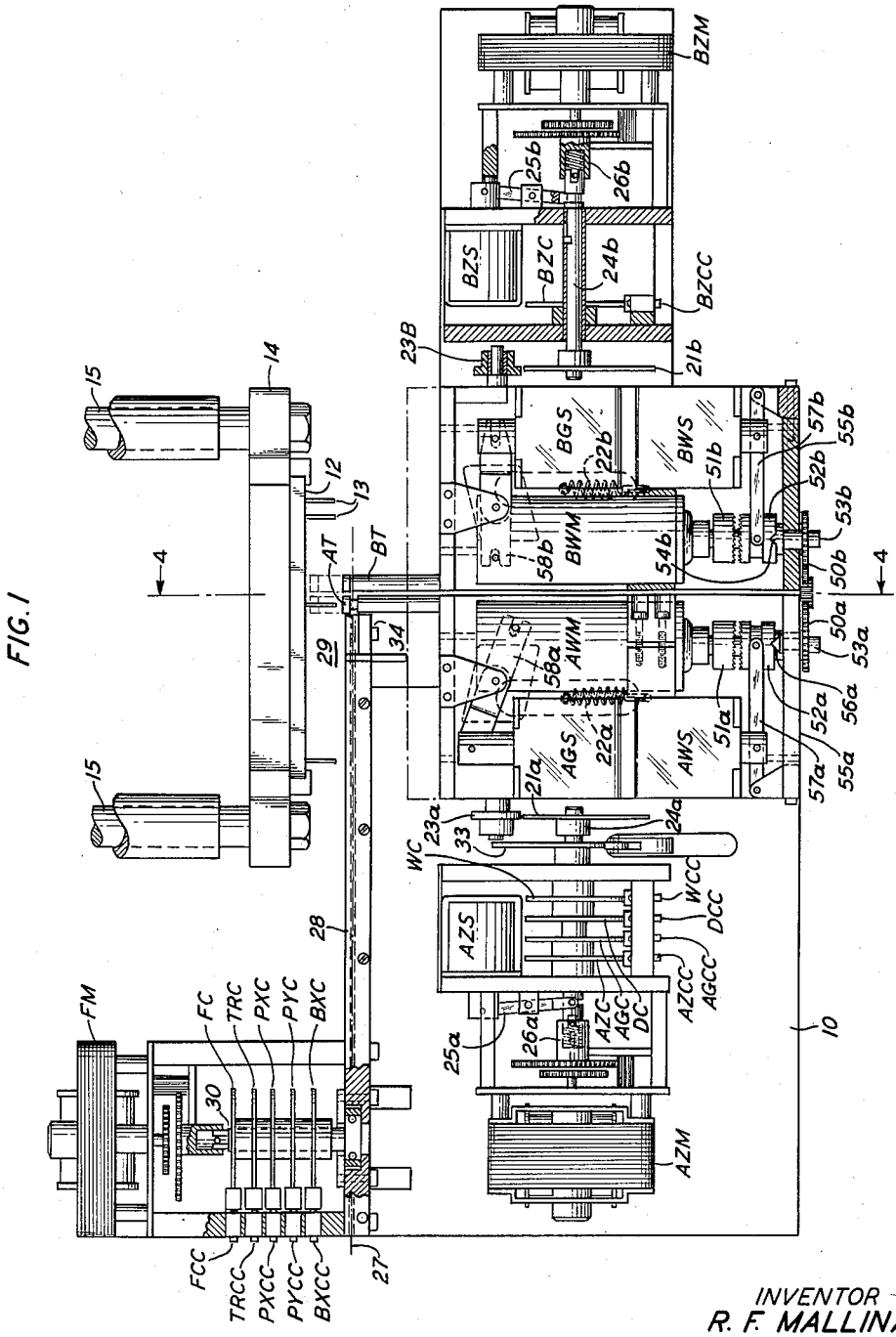
INVENTOR
R. F. MALLINA
BY John C. Morris
ATTORNEY

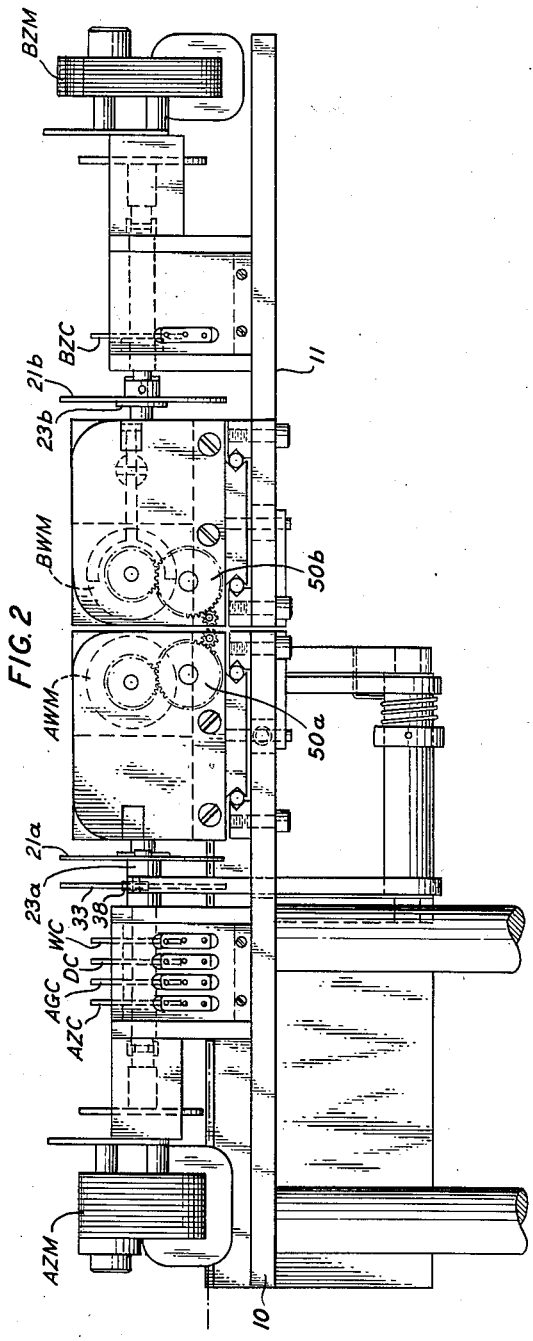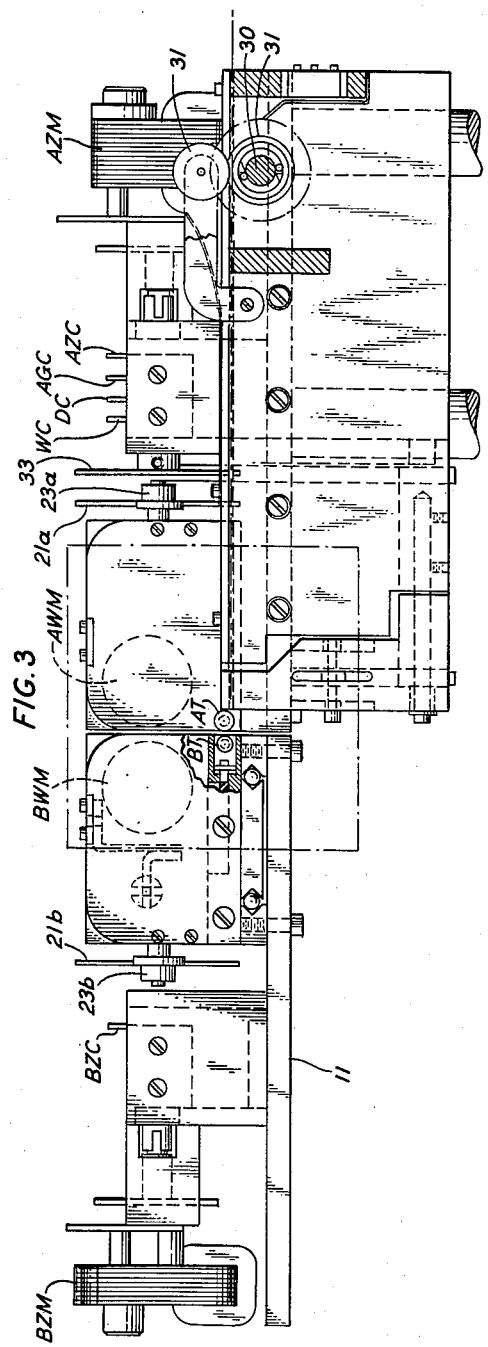

Sept. 22, 1959   R. F. MALLINA   2,905,400
WIRE CONNECTING MACHINE
Filed Dec. 31, 1953   7 Sheets-Sheet 3

INVENTOR
R. F. MALLINA
BY John C. Morris
ATTORNEY

Sept. 22, 1959
R. F. MALLINA
2,905,400
WIRE CONNECTING MACHINE
Filed Dec. 31, 1953
7 Sheets-Sheet 4
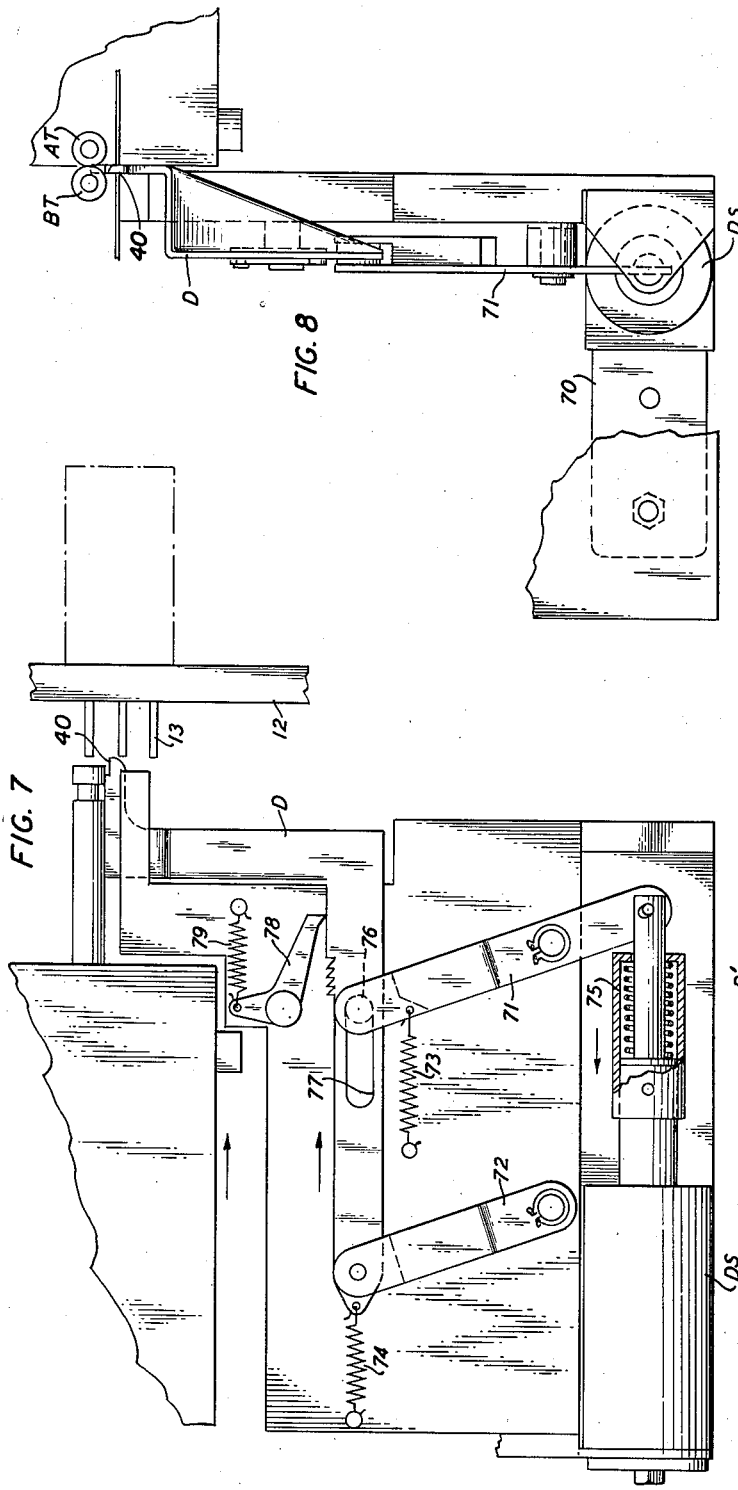
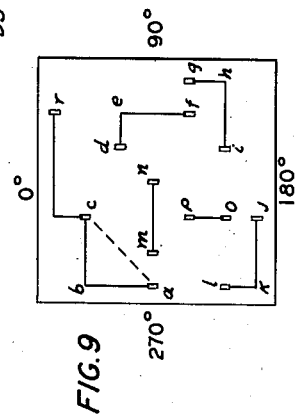
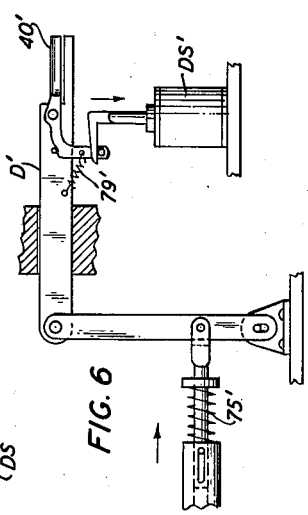
INVENTOR
R. F. MALLINA
BY John C. Morris
ATTORNEY Sept. 22, 1959 R. F. MALLINA 2,905,400
WIRE CONNECTING MACHINE
Filed Dec. 31, 1953 7 Sheets-Sheet 5

INVENTOR
R. F. MALLINA
BY John C. Morris
ATTORNEY

Sept. 22, 1959     R. F. MALLINA     2,905,400
WIRE CONNECTING MACHINE
Filed Dec. 31, 1953     7 Sheets-Sheet 6

INVENTOR
R. F. MALLINA
BY John C. Morris
ATTORNEY

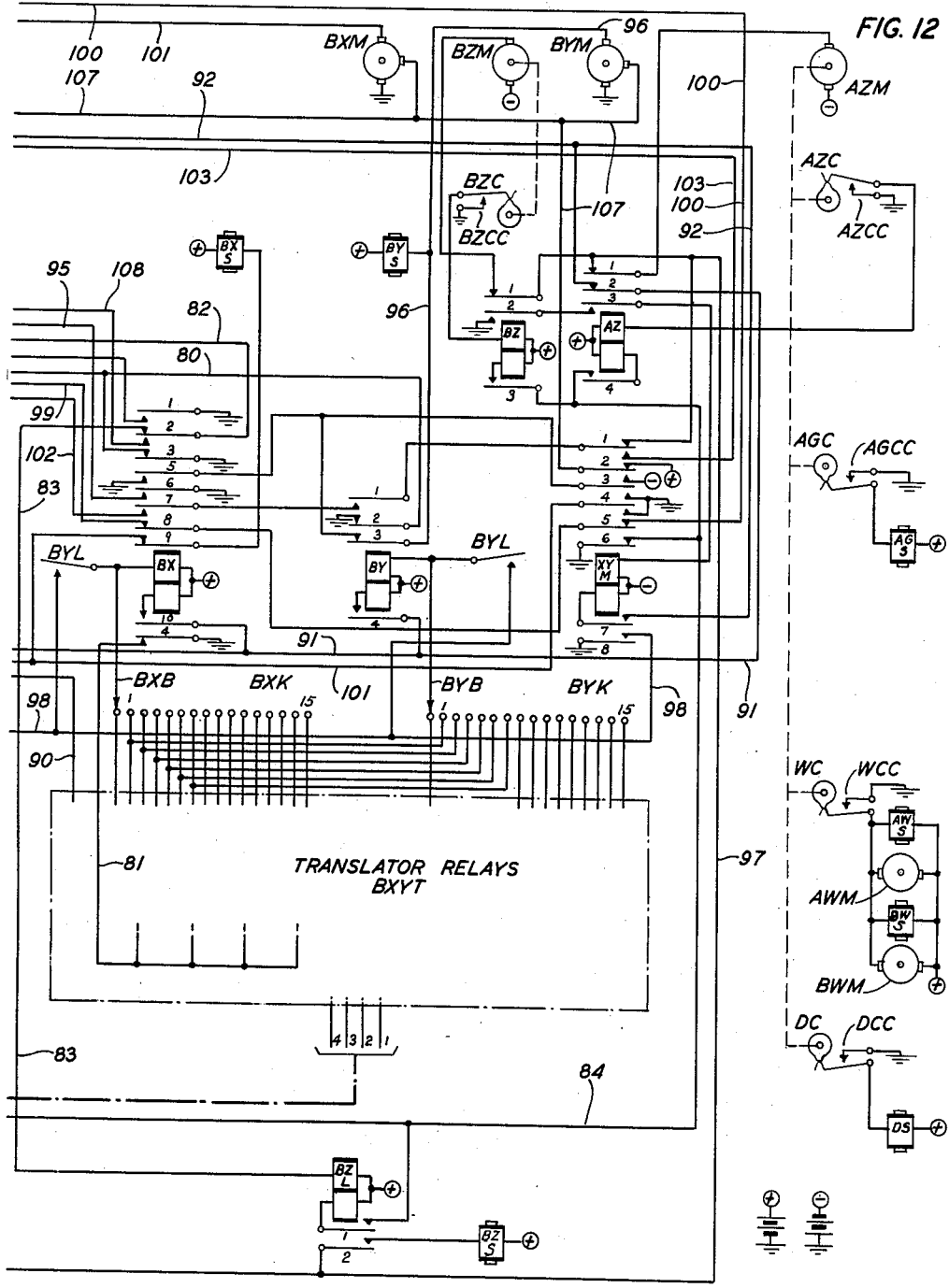

United States Patent Office 2,905,400
Patented Sept. 22, 1959

2,905,400

WIRE CONNECTING MACHINE

Rudolph F. Mallina, Hastings on Hudson, N.Y., assignor to Bell Telephone Laboratories, Incorporated, New York, N.Y., a corporation of New York Application December 31, 1953, Serial No. 401,505

2 Claims. (Cl. 242—7)

This invention relates to wiring systems and more particularly to a coordinated system of controlled machinery for connecting wires between terminals of a mounted array of electrical apparatus units.

Generally, similar systems are disclosed in an application of R. F. Mallina, the present applicant, Serial No. 370,147, now Patent No. 2,862,670, and an application of T. L. Dimond, Serial No. 370,148, now Patent No. 2,862,- 671, both filed July 24, 1953, and issued December 2, 1958. The present system differs in various respects from those noted, as will appear more fully in the ensuing description of an exemplary embodiment thereof.

An object of this invention is to expedite the interconnection of designated terminals of a plurality of mounted units of electrical apparatus.

A further object of this invention is to improve the distribution of multiple interconnections amongst a plurality of apparatus elements having an array of terminals.

A more specific object of this invention is to carry out a complete wiring program or scheme for a mounted group of apparatus elements by suitably controlled machinery having a limited number of degrees of freedom.

A feature of this invention resides in a wiring machine including wire wrapping tools or guns and a panel mounting frame or structure, motors for relatively moving the guns and the panel to respectively juxtapose each gun to a designated terminal on the panel, and means for applying the guns to said terminals to make connections respectively thereto.

More specific features lie in an assemblage comprising an apparatus panel support, wiring gun or tools, a wire feeding device and a wire dressing device; the panel support being operable to position the panel with respect to one of the tools, means for positioning the other tool with respect to the panel, and means for positioning the dressing device in coordination with the tools, means for applying the wiring tools to designated terminals for making connections, and means for controlling the operation of all of said means including code responsive means.

An additional feature of this invention resides in means for controlling the wire applying position of the wiring tools with respect to the terminal being wired, whereby several connections may be made on the same terminal.

Further objects and features of this invention will appear more fully and clearly from the appended drawings in which:

Fig. 1 is a plan view of a portion of a wiring machine illustrative of this invention;

Fig. 2 is a view in elevation of the same portion of the machine looking toward the panel;

Fig. 3 is another elevational view looking in the opposite direction to that of Fig. 2;

Fig. 6 is a schematic representation of a wire dressing device;

Fig. 7 is a view in side elevation and Fig. 8 a view in end elevation of another wire dressing device;

Fig. 9 is a diagrammatic view of a panel with representative connections thereon;

Figs. 11 and 12 taken together comprise a wiring diagram of the motive and control systems.

Figure 4:
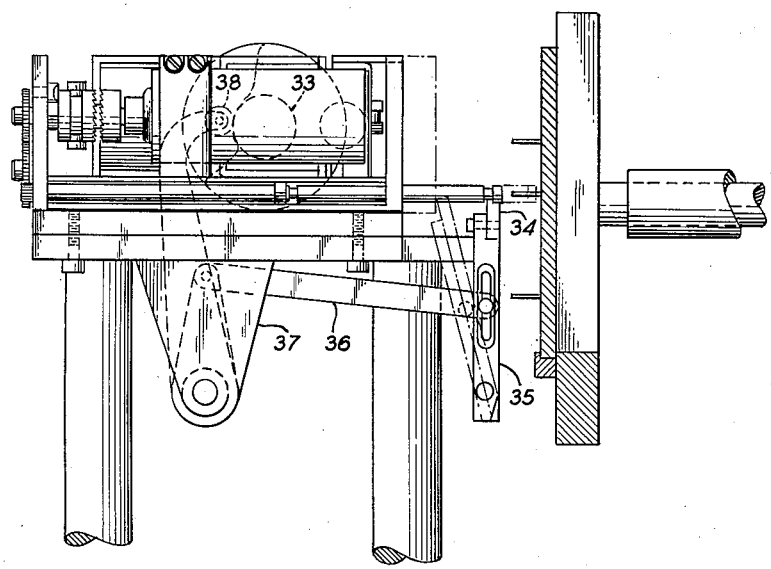
Fig. 4 is a sectional view on the line 4—4 of Fig. 1.

In order that the system of this invention may be better understood, it is believed that a somewhat generalized discussion of features thereof in the light of some background information is desirable.

Applicant's previously noted application Serial No. 370,147 discloses a wiring system in which two wiring guns move in a coordinate system over the face of a panel to be wired in accordance with a wiring scheme. The guns are loaded with wire at a home position and then are moved to the respective terminals to be interconnected, are applied each to its terminal and connect the opposite ends of the wire to the terminals. The wire is fed from a storage element which accompanies one of the guns. The guns move over prescribed paths so as to lay the wire in accordance with a predetermined pattern. Dressing pins on the panel and also accompanying the guns, aid in positioning the wire as required. After each interconnection, the guns return to a home position for reloading with wire and continue to make interconnections as required.

In the noted application, Serial No. 370,148 of T. L. Dimond, a single wiring tool or gun having a wire supply associated therewith, is moved in a coordinate system first to one terminal to make an initial connection and then to another terminal to make a final connection. The gun then is moved to still another terminal for an initial connection and so on until the panel is wired.

In each of these systems, information, which has been previously stored in accordance with a wiring scheme, is fed into sensing means to supply the necessary motion commands. The stored information may be in various forms, the one chosen for illustrating the noted systems being code punched tape.

The machines of these previously disclosed systems, with proper planning of the wiring scheme, can interconnect any two terminals of an array with the wire laid over any one of several prescribed paths. The wiring guns of each of these systems are capable of moving in an $X-Y$ coordinate system either to the right ($+X$), the left ($-X$), up ($+Y$) or down ($-Y$) during the wire laying operations.

In the present system, one writing gun remains stationary while the other moves. The stationary or fixed gun, so called because it has no X or Y motion, has been designated as the A gun, and the movable gun as the B gun. In order to position a designated terminal at the A gun, movement of the panel in $X-Y$ coordinates is employed. The panel movement may be in both the plus and the minus X and Y directions. The B gun is limited in its movement from a home position adjacent the stationary A gun to motion in one direction and in one sense or such a motion followed by a motion at right angles to the direction of the first motion and in one sense only, e.g. $+X$ alone or $+X$ followed by $+Y$. Other combinations of movement are possible within the restrictions noted. To compensate for, and also to take advantage of these limitations, means are provided for rotating the panel in the wiring plane to any one of four positions 90 degrees apart.

In this system, a straight run of wire follows the path of the B gun but a run with a right angle bend therein does not, the configuration being determined by the cooperative action of the wiring guns and of a dressing finger. In Fig. 8, which is a view looking at the ends of the wiring tips of the two guns from the panel position, the dressing finger is designated as 40. This finger partakes of the vertical movement of the B gun but has no horizontal (X) motion in the XY coordinate system. As may be seen, this finger 40 is located substantially on a tangent to the A gun wiring tip circle. Thus when the B gun moves vertically the finger will pass the A gun tip and move, upwardly in this case, with the B gun. The wire, which has been threaded into the guns and gripped by the B gun, is pulled through the A gun and a loop thereof carried upward by the dressing finger. The wire is thus laid in an L-shaped configuration, in this case an inverted L. The details of the structure just previously described will be set forth in the subsequent description.

The wiring configurations possible with this system may now be considered in connection with the diagram of Fig. 9. A pattern of illustrative wire runs is shown and panel positions are indicated. The viewpoint is opposite to that of Fig. 8, i.e. looking at the panel. Considering first a machine with the B gun to the right of the A gun (still looking at the panel), to make a connection from a terminal at $a$ to one at $c$ the panel in the zero degree position is first moved in $X-Y$ coordinates to place the terminal at $a$ in front of the A gun. The B gun then moves to the right until its tip is directly below the terminal $c$. Then the B gun moves up to $c$. The dressing finger at the same time moves up to $b$ carrying one end of the horizontal portion of the wire and pulling out wire for the vertical run. The guns then move in toward the panel and make the connections. The resultant of the movement of the B gun in making a connection from $a$ to $c$ is the dashed sloping line $a-c$ having a positive slope in the coordinate system.

It may be well to note here that the $+Y$ motion of the B gun and of the dressing finger might be made first and then the B gun $+X$ motion. Also the $+X$ and $+Y$ motions of the B gun could be performed simultaneously. However, in each case the wire, as it is pulled out by the B gun, would be drawn around the dressing finger. Since the increased friction accompanying such modes of operation may be avoided by the operational sequence $+X$ and then $+Y$, advantage is taken of this situation.

With the noted orientation of the wiring guns, a connection from terminal $d$ to terminal $f$ via $e$ may be made by turning the panel to the 90 degree position. Connections from $g$ to $i$ via $h$ and from $j$ to $l$ via $k$ may be similarly made with the panel of the 180 degree and 270 degree positions respectively. The B gun can always move horizontally, i.e. in the $+X$ direction, which, assuming that the zero degree position is the position of installation, will give horizontal runs such as from $m$ to $n$ or $n$ to $m$ for the zero degree and 180 degree panel positions respectively; and vertical runs such as $o$ to $p$ and $p$ to $o$ for the 90 degree and 270 degree positions respectively.

With the guns arranged as indicated, it is possible to interconnect all possible terminal pairs by wiring in a first position and then in a second position, at zero degree and 90 degree panel orientations, respectively. In order to obtain a better distribution of the connecting wires, it may, however, be desirable to wire in three or four panel orientations.

If it is desired, the wiring guns may be differently arranged, for example with the movable B gun to the left of the stationary A gun. For such an arrangement, the B gun would move in the $-X$ direction or in the $-X$ and then in the $+Y$ direction. The panel may in this case also be rotated in 90 degree increments to obtain other wiring configurations. Similar arrangements with the movable B gun above or below the fixed A gun may also be provided.

In the embodiment chosen to illustrate this invention the movable or B gun is immediately to the right of the stationary or A gun when in the home position, and moves horizontally to the right $+X$ and vertically upward $+Y$ in carrying out the wiring operations. The return to the home position is horizontally to the left $-X$ and vertically downward $-Y$. Since no wire is being handled during the return movement and there is no excessive friction problem, these motions may take place simultaneously. The X and Y panel motions may also occur simultaneously both for initial positioning and return or homing travel.

In order that the X and Y motions of the B gun and the panel rotation may be accomplished without interference between the terminals and the gun tips, there is at all times, except during wire wrapping, a space between the terminal ends and the gun tips. This space may be closed when necessary by a panel or gun movement perpendicular to the plane of the panel. This motion has been designated in the coordinate system as Z motion.

The Z motion is imparted advantageously to the individual guns. The extent of the Z motion of each gun may thus be independently controlled. It is possible with such an arrangement to make more than one connection to each terminal. For example: A connection is required from terminal $a$ to terminal $c$ (Fig. 9), there being presently no other connections to these terminals. The Z motion of each gun is such as to wrap each connection on that portion of each terminal close to the panel. Continuing the example, a further connection is required from terminal $c$ to terminal $r$, the latter having presently no connection thereon. The Z motion of the gun making the connection to the terminal $c$ will be limited so that the second connection is wrapped in a position on the terminal not occupied by the first connection. The gun connecting to $r$, however, is fully extended in the Z direction to make an initial connection. Although the mechanism illustrated is designated to make two connections per terminal, it may obviously be adapted to make more if this is desired or necessary.

The system and mechanism of this invention may be used to great advantage in the wiring of unit sections of a panel, which may be interconnected to form a large panel of desired extent. An exemplary modular unit may be eight inches square with rectangular subunits 4" x 8" and 2" x 8". If a ½ inch border on the 8" x 8" unit is reserved for unit panel interconnecting terminals, the remaining 7" x 7" space will accommodate 29 rows of 29 terminals with ¼ inch spacing, a total of 841 apparatus terminals. The spatial requirements of various apparatus elements and their terminal requirements may well not use all of the possible 841 terminal positions, but they are available and allow for many advantageous arrangements of elements.

The illustrative embodiment shown in the drawings and particularly Figs. 1, 2 and 3 includes an A gun slidably mounted on a fixed platform 10 for motion in the Z direction only. A B-gun, shown in its home position beside the A gun, is likewise slidably mounted for Z motion with respect to the movable platform 11. The platform 11 is in turn mounted for X motion on an elevator which is mounted for Y motion relative to a base. The means for imparting X and Y motions to the B gun have not been shown in Figs. 1, 2 and 3 since they are screw and slide devices essentially like those to be disclosed in connection with panel X and Y motion imparting means.

Figure 5:
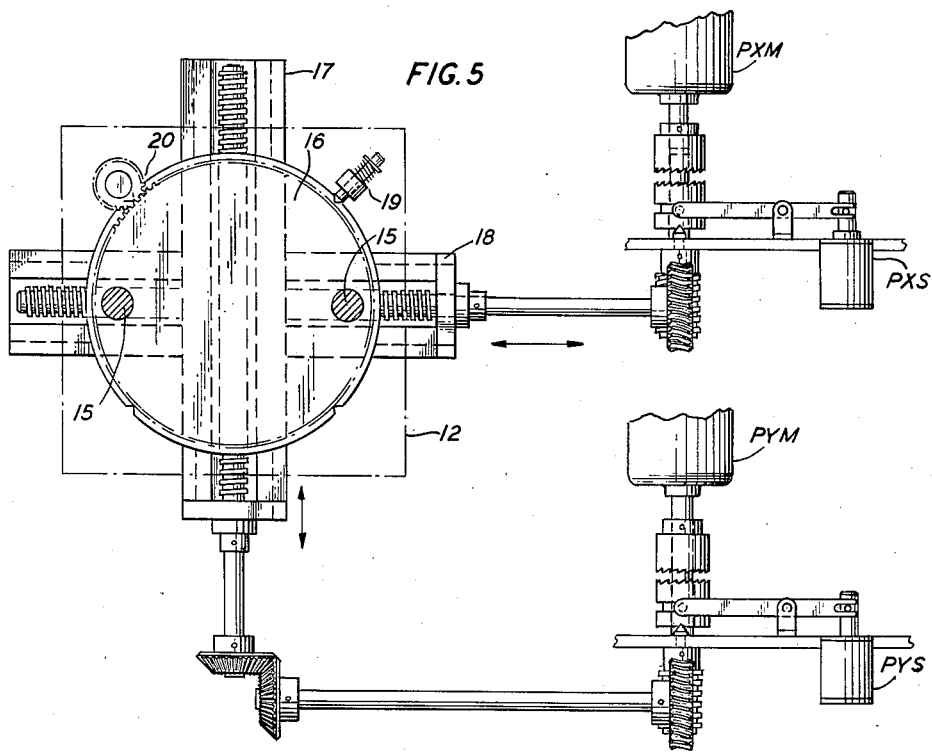
Fig. 5 is a view in elevation of drive means for the panel of Fig. 1.

As shown in Fig. 1, a panel 12 having terminals 13 thereon is mounted in a frame 14 supported by studs 15 which extend back to a motion imparting assembly shown in Fig. 5. The studs 15 are connected to a rotatable plate 16 which is in turn mounted on a vertically movable or elevator slide 17. The slide 17 is secured to a horizontally movable slide 18. The slides, which may be conventional cross slide devices of the type used on lathes, etc., are driven respectively by the motors PXM and PYM. The slides carry brushes PXB and PYB which cooperate with rectilinear commutators PXK and PYK respectively. These brushes and commutators, not shown in Fig. 5, are like the BYB brush and BYK commutator schematically shown in Fig. 10. Detent means 19 may be used to hold the frame in each of the 90 degree positions it is adapted to occupy. The frame may be rotated by hand or by a motor connected to the drive pinion 20. If a motor is used it may be controlled from the control system to be described.

The B gun X and Y motion slides, not illustrated, are similar to the corresponding panel motion slides and are driven by motors BXM and BYM. The slides for the B gun carry brushes BXB and BYB cooperating with commutators BXK and BYK.

Figure 10:
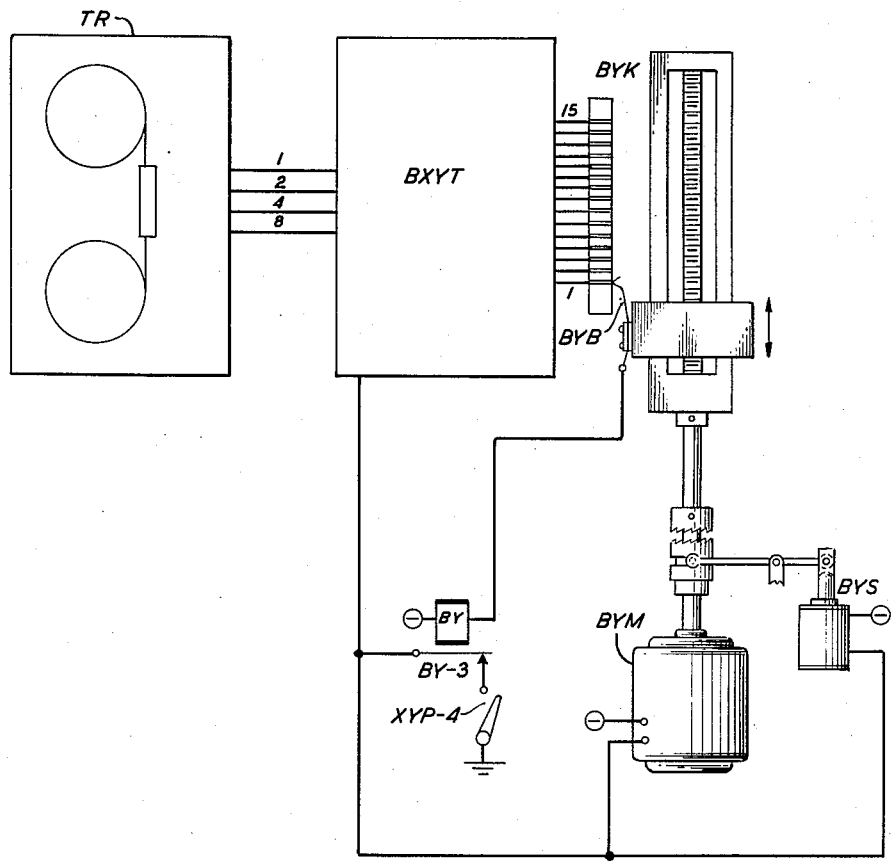
Fig. 10 is a schematic representation of the control and motive systems of a wiring gun.

As may be seen in the schematic representation of Fig. 10 the motor BYM is connected by a clutch to the B gun elevator. The brush BYB on this elevator cooperates with the commutator BYK (see also Figs. 11 and 12). Information from the tape reader TR goes to the translating relays BXYT and provides for a ground connection to a selected segment of the commutator BYK. When the brush BYB reaches the grounded segment, the relay BY is energized and opens the motor and clutch solenoid circuits stopping the B gun motion in the Y direction at a prescribed coordinate point. Similar arrangements are provided for B gun X motion and panel X and Y motions as will be described from the circuit viewpoint in connection with Figs. 11 and 12.

The Z motion is imparted to the A gun and to the B gun respectively by the cams 21a and 21b on the cam shafts 21a and 21b driven through suitable gearing by the motors AZM and BZM respectively. The Z motion slides are biased to the retracted position by suitable means such as the springs 22a and 22b. Mounted on each slide is a multidiameter follower 23a or 23b for cooperating with the cams 21a and 21b. The contour of the cams is such that the associated guns are projected to wire wrapping position at the proper time, remain projected for a sufficient time to allow wrapping of the connection and then are retracted.

The shafts 24a and 24b of the cams 21a and 21b are axially movable by the levers 25a and 25b and the solenoids AZS and BZS respectively to shift the associated cams to a position opposite the smaller diameter of the followers against the bias of the springs 26a and 26b. Thus the cams are normally opposite the larger diameter of the follower and project the guns fully to make a first connection near the base of a terminal. If second connection is required, the appropriate solenoid AZS or BZS is energized causing the cam to operate on the smaller diameter of the follower and to project the associated gun a lesser distance for a second connection on the terminal.

A plurality of switching cams AZC, AGC, DC and WC are mounted on the cam shaft 24a of the motor AZM to rotate therewith. These cams respectively operate the switches or contactors AZCC, AGCC, DCC and WCC. A cam BGC is similarly associated with the cam shaft 21b of the motor BZM to operate a contactor BGCC. The functions of these cams and contactors will be brought out in connection with the description of the operating and control circuits.

The insulated wire 27 for making connections is stored on a reel or spool (not shown) suitably mounted adjacent the A gun assembly. A wire guide or duct 28 directs the wire through a cutter or shear 29 to the tips of the wiring guns. The wire is fed by means of feed rollers driven by the motor FM through suitable gearing and the cam shaft 30. The feed rollers 31 are driven through a so-called free wheeling clutch arrangement which causes the rollers to project the wire toward the guns but allows the wire to be pulled through without rotating the cam shaft 30.

A plurality of switch operating cams FC, TRC, PXC, PYC and BXC are mounted on the cam shaft 30 associated with the motor FM for rotating therewith. These cams respectively operate the switching contactors FCC, TRCC, PXCC, PYCC and BXCC for purpose to be described.

As shown in Fig. 4 the wire cutter or shear 29 is operated by a cam 33 secured to the cam shaft 24a of the motor AZM. The cutter member 34 is secured to the end of the pivoted lever 35 which is connected by the link 36 to another pivoted lever 37 on which is mounted the cam follower 38. The cutter operating means is normally biased so that the member 34 is in line with the wire duct 28. At the appropriate time during the rotation of the AZM motor cam shaft the member 34 is pulled back by the linkage to shear the wire at a suitable distance from the A gun tip and to dress it back alongside this tip.

The dresser D, the end 40 of which is designated as the dressing finger, is secured to the A gun side of the B gun elevator to partake of B gun vertical motion. A bracket 70 for connecting the dresser D to the elevator is shown in Fig. 8. The dressing finger lies just below the gun tips and substantially in the division plane between them, when the B gun is in the home position as may be seen in Fig. 8. Since the dressing finger carries one end of the horizontal portion of the wire for all right angle runs, the dresser D must be given Z motion along with the gun tips. This Z motion may be accomplished by a mechanical connection to the B gun Z motion slide as shown schematically in Fig. 6 or by the means shown in Figs. 7 and 8.

In Figs. 7 and 8 the dressing finger 40 is rigidly secured to or integral with the dresser D, which is projected toward the panel by the operation of the solenoid DS. The dresser D is mounted on the operating lever 71 and the supporting lever 72 which are biased to retracted positions by the springs 73 and 74. The operating lever 71 is connected to the core of the solenoid DS by a spring type lost motion means 75. Thus if the dressing finger in its panelward motion encounters a wire, which has been previously connected, it will yield, thereby avoiding damage to said wire.

When the solenoid DS is energized, the operating lever moves the dresser D and its dressing finger upwardly a short distance as well as toward the panel. When the solenoid DS is de-energized the operating lever moves back, its pin 76 riding in the slot 77 thereby depressing the dressing finger somewhat below its initial level. This allows the dressing finger to be withdrawn without disturbing the wire, which has been tensioned therearound by the wrapping operation. The dressing finger does not start to move back until after it is depressed, because the dresser is held in the forward position by the latch 78 biased by the spring 79. When the lever 71 has depressed the dresser D sufficiently, it drops away from the latch and is retracted by the spring 74. The dresser is provided with several teeth or notches to cooperate with the latch 78 so that it will be latched at whatever position the finger stops in its forward motion. The dressing finger is raised slightly prior to wire wrapping to provide a small amount of slack in the finished connection thereby avoiding impingement of the wire on an adjacent terminal because of the tension caused by wrapping.

In the modification schematically illustrated in Fig. 6, the dresser D' has a pivoted dressing finger 40' and is mechanically linked by a yielding connection 75' to the B gun Z motion slide, to move inwardly therewith. During the panelward motion the finger 40' is slightly below the level of the B gun tip as in Fig. 8, due to the biasing action of the spring 79'. Before the wrapping operation, however, the solenoid DS', which corresponds to the solenoid DS, is energized to raise the finger slightly to lift the wire, as in the previously described modification. The solenoid DS' is de-energized and the finger drops prior to its withdrawal. The withdrawal is thus expedited and the undesired tension on the connecting wire is relieved.

In order to allow the wrapping tips AT and BT of the A and B guns to be brought close together in the home position said tips or wrapping heads are mounted alongside of their respective wrapping motors AWM and BWM. The wrapping heads are driven through the clutches AWC and BWC and the gearing 50a and 50b. The clutches are biased to the disengaged condition and are engaged, respectively by the clutch solenoids AWC and BWS.

Since the clutch mechanisms are alike, a particular description of one will suffice for both. The driving clutch member 51a is secured to the motor shaft and rotates therewith. The driven clutch member 52a is connected for rotation with a driven shaft 53a and is slidable thereon. The driven shaft is journaled at one end within the motor shaft and at the other end in the housing 55a adjacent to the gearing. The end of the slidable clutch member 53a adjacent to the gearing has a notch 54a which cooperates with a homing or indexing pin 56a on the housing 55a. When one of the solenoids, say AWS, is energized the lever 57a causes the clutch member 52a to disengage its notch 54a from the pin 56a and to engage with the driving clutch member 51a to rotate the corresponding wrapping head. Upon de-energization of the solenoid the clutch member is urged toward disengagement by an appropriate biasing means, but does not disengage until the notch 54a engages the pin 56a. The wrapping head is thus always indexed to a suitable position after each wrapping operation.

The wrapping heads or tips of the wiring guns of this machine may be like those disclosed in the patent application of Frank Reck, Serial No. 388,082, filed October 26, 1953. These tips comprise a spindle having a shank portion and an enlarged head, and a sleeve axially slidable on the shank. The spindle head and sleeve are provided with notches designed to grip the wire and mutilate the insulation as more fully set forth in the noted application. The wire is loaded into the slot or space defined by the enlargement at the end of the wrapping spindle and the outer end of the sleeve. When the sleeve is brought forward toward the spindle enlargement, the wire is gripped by the wiring head; its insulation is mutilated in preparation for stripping and the free end of the wire is dressed back along the wiring head in preparation for wrapping. The gripping operation is performed by the gripper solenoids AGS and BGS for the A and B guns respectively against the bias of suitable springs or like means. The plungers of these solenoids are connected to the gun sleeves by the levers 58a and 58b. It might be here noted that the various biasing means associated with the different solenoids and not shown, are within the solenoid structures and may be conventional springs.

The various repetitive motions in the operation of the machine of this invention are controlled by the cams on the cam shafts of the motors FM, AZM and BZM. The X and Y motions of the panel and of the B gun, the limitation on the Z motions of the guns in connection with making a second or additional connection at the terminal, and other directions such as for stopping or for panel rotation, are controlled from a prepared record. The record here used is similar to that employed in the system disclosed in applicant's noted application. Serial No. 370,147 and comprises code perforated tape. A binary code is used for directing the X and Y motions. One line of arbitrary code working on a "yes" or "no" basis is used for specific directions such as stopping, limitation on Z motion, etc.

The perforated tape may be read by a conventional telegraph type reader or sensing means such as that disclosed in Patent 2,468,462, W. T. Rea, April 26, 1949, or Patent 2,626,994, A. Weaver, January 27, 1953. The binary signals from this means may be fed into a binary code translating relay circuit and passed on by transfer relays to the commutators associated with the devices having X and Y motions. The translating circuit is of the type illustrated in the book entitled "The Design of Switching Circuits," by Keister, Ritchie and Washburn, published by D. Van Nostrand Company, Inc., New York, New York, at page 308, Fig. 13–3. The binary code is discussed and illustrated on pages 278 and 279 of the same book.

In the interest of simplicity, the machine herein disclosed for illustrating the invention has been limited to not more than 16 commutator segments, which can be handled by a four element binary code having the elements 1, 2, 4 and 8. A machine to handle an 8" x 8" panel with terminals spaced at ¼ inch as previously described would require a five element code, i.e. 1, 2, 4, 8 and 16 with the requisite additional relays and commutator segments.

Figure 11:
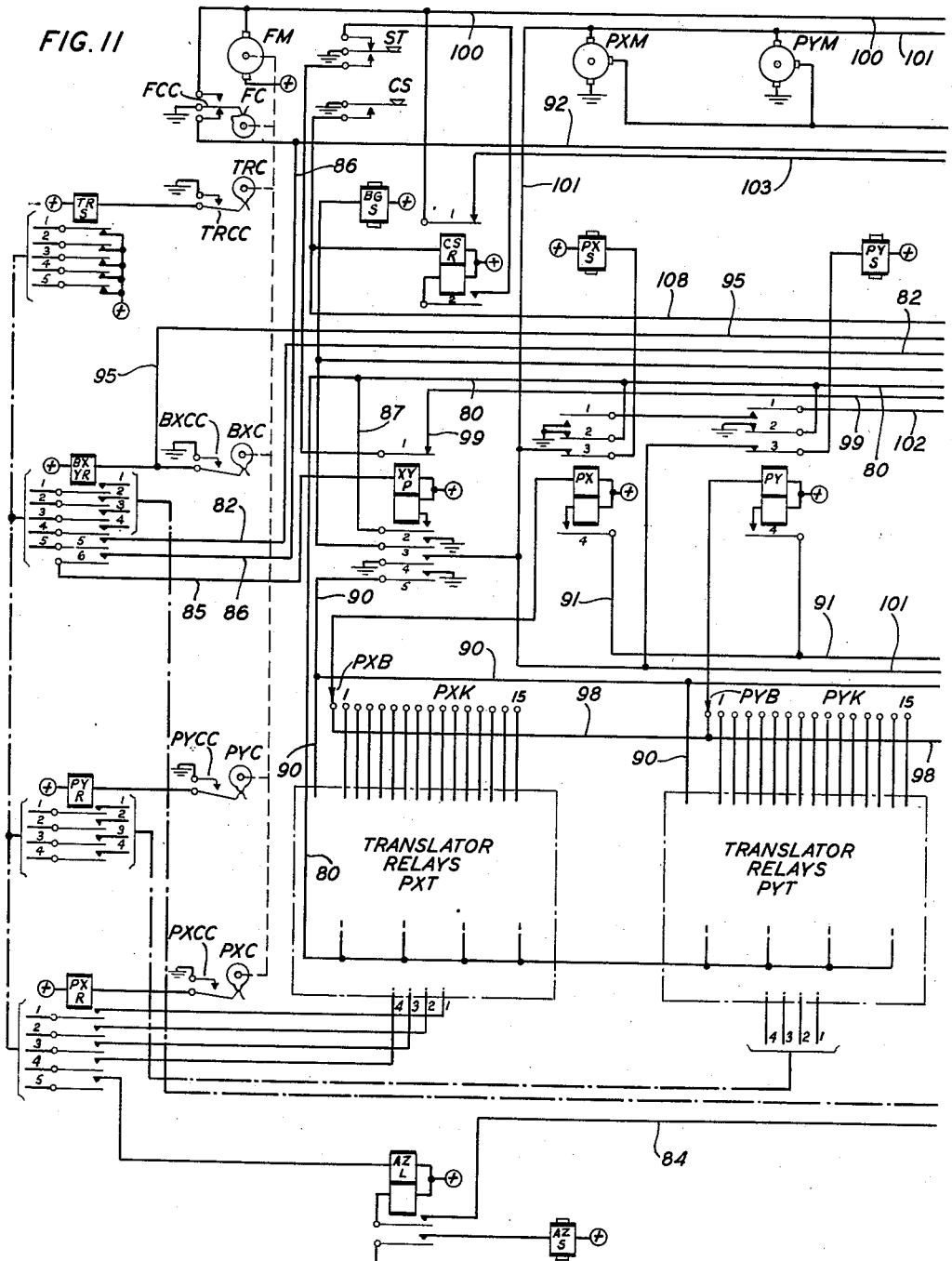

The wiring machine of this invention having been prepared by inserting suitable insulated wire from the supply spool in the channel or duct 26 up to the cutter 27 and with a panel mounted in the frame 14 may be set into operation by a momentary closing of the starting switch ST (see Fig. 11). The feed motor FM is started, rotates the associated cam shaft 30 one revolution and stops. The cam FC is designed to keep the motor FM in operation during this cycle by keeping a contact FCC. The feed roller is of a diameter to project sufficient wire into the guns to provide a connection wrapping length of wire beyond the B gun.

The cam TRC closes the switch TRCC four times during one cam shaft revolution thus stepping the tape reader TR four times. The information sensed during the first three steps is stored in the translating system for determining the panel X and Y motions and the B gun X motion. The information for the B gun Y motion is available at the reader and is used after the B gun X motion has been completed. The panel X motion information is transferred from the reader TR to the PXT translating relays via the transfer relay PXR by action initiated by the cam PXC. If the A gun is to make a second connection, this information is on the tape at this position and is also transferred by the relay PXR to a storing relay AZL for use during the Z motion. Thereafter the panel Y, and B gun X motion information are likewise successively transferred to the PYT and BXYT translating relays via the transfer relays PYR and BXYR by action due to the cams PYC and BXC respectively. The relay BXYR also transfers B gun second wrapping information to a storing relay BZL if required. The cams PXC, PYC and BXC are operated successively and for a short period only to store the positioning information in the translating relays, dropping out when the information is stored.

Operation of the relay BXYR, the last of the three transfer relays to be operated, energize the relay XYP. Operation of the relay XYP energizes the grip solenoid BGS causing the B gun to grip the wire and prepare it for wrapping and stripping. Energization of the relay XYP also puts the motors PXM, PYM and BXM into operation and operates their clutches to connect them for performing the X and Y panel motions and the B gun X motion. Upon completion of the noted motions each motor is stopped and disconnected, the indexing means assuring exact positioning of the driven elements.

The transfer relay BXYR is re-energized as an incident of the B gun X motion completion and transfers the B gun Y motion information set up in the tape reader TR to the B gun translating relays BXYT. The B gun Y motion motor BYM is also energized in connection with the B gun X motion stoppage and moves the B gun and the dresser to their designated Y positions.

Completion of the X and Y positioning of both the panel and the B gun initiates the operation of the Z motion motors AZM and BZM. The cams AZC and BZC on the cam shafts of these motors respectively limit these cam shafts to one revolution. If the dresser D of Figs. 7 and 8 is used, the dresser cam DC is proportioned so that the dresser solenoid DS will be operated as the A gun Z motion starts to move the dresser toward the panel. If the dresser D' of Fig. 6 is used, the proportioning will be such as to lift the dresser finger after it has moved in with the B gun.

Operation of the cam AGC causes the A gun to grip the wire and the mechanically operated linkage to operate the cutter to cut the wire and dress it back along the A gun wiring head. Meanwhile, the cams 21a and 21b in cooperation with their respective followers 23a and 23b are moving the guns panelward against the bias of the springs 22a and 22b. If either gun is to make a second connection, the previously stored information to that effect in the AZL or BZL relays is employed to operate the required AZS or BZS solenoid or both of them to position the cam to operate on the small diameter of the follower 23a or 23b. The cam WC is proportioned so that the wrapping operation is initiated after the various preparatory operations are completed.

The AZC and BZC cams have sufficient dwell to keep the guns advanced for enough time to allow the connections to be wrapped. These cams then allow the springs 22a and 22b to retract the guns.

When the guns are fully retracted, the cams AZC and BZC cause the motors AZM and BZM to stop and also operate the return motion relay XYM. This relay reverses the connections to the positioning motors, which are started to drive the panel and the B gun toward their home positions. The positioning motors are individually stopped as the corresponding panel or B gun X or Y component of return motion is completed. When the last repositioning motion is completed, one wiring cycle is completed. The interconnections are such that the motor FM is then restarted to begin another cycle unless information to the contrary has been set up either manually or by means of the tape reader. Stopping of the machine in either case is controlled by operation of the relay CSR to interrupt the starting circuit. If the cycle stop button CS is operated during a cycle, the relay CSR is operated and locked up in preparation for stopping the machine when the cycle is completed. The relay CSR may also be operated by tape information given by a hole in the command line and in the B gun Y motion information row.

As a new cycle is started, the cam FC, besides locking up the FM motor control, opens the locking circuit for the relays PX, PY, BX, BY and XYM preparing them for the next cycle. If the machine has been stopped by the operation of the relay CSR, a manual start by the pushbutton ST may be initiated after de-energization of the then operated relays BX and XYM, through contacts of which the pushbutton starting circuit is interlocked. This may be done in any convenient manner. One way is to momentarily disconnect the power supply from the relays. Another is to momentarily open the holding circuit of these relays by means of a contact controlled by the operating means of the starting switch ST prior to the closing of the initiating circuit.

As has been noted, the frame 14 may be rotated in 90 degree increments to four different wiring positions. This may be done manually by a knob or handle connected to the pinion 20 at the end of the series of wiring cycles for a given panel position. If it is desired that the panel rotation be automatic, a motor and control means may be provided. An indication that the panel is to be rotated may be given on the command line of the tape. A convenient place for this command is in a row having panel Y motion information. The panel rotation information may be stored in an additional relay not shown in the wiring diagram and may be used in response to a stopping signal by way of an additional contact of the stopping relay CSR. Conventional switching means operated by completion of the panel rotation may then be used for restarting the machine.

As an example of how the machine of this invention may be used, the interconnection to two specific terminals may be considered. Referring to Fig. 9, assuming that the terminal $a$ at say $X=2$, $Y=7$ and the terminal $c$ at $X=6$, $Y=13$ are to be interconnected and that there is already a connection on the terminal $c$, the record tape for the reader TR has a first row of information for the panel X positioning with a perforation for the binary code 2. The second row for the panel Y positioning has perforations for the binary code $1+2+4=7$. The third row of information on the record tape for the B gun X positioning will have a perforation for the binary code 4 and one for the arbitrary command for a second wrap by the B gun. The fourth row will have perforations for the binary code $2+4=6$. It will be noted that the codes for the B gun positioning are not for the position of the terminal $c$ with respect to an arbitrary zero point in the coordinate system, but with respect to the terminal $a$ in its $X=2$, $Y=7$ position in front of the A gun due to previous panel motion. In other words, the directions for the B gun are to go four increments to the right from $X=2$ to $X=6$ and then to go six increments upward from $Y=7$ to $Y=13$. The B gun X direction commands take into account the fact that the B gun starts slightly to the right of the A gun.

In the following circuit description the contacts will be referred to as front or normally open contacts and back or normally closed contacts and the relay contacts will usually be designated by the relay reference character and a contact number, e.g. back contact XYP—1, front contact BY—4, etc.

Momentary operation of the starting switch ST makes a ground connection to complete the circuit to the feed motor FM. The circuit is from the front contact of the switch ST by way of the back contact XYP—1, the lead 99, back contact BX—8, back contact XYM—5, the lead 100, through the motor FM and the source of power to ground.

The motor FM rotates the cam shaft closing the back contact FCC by means of the cam FC which circuit maintains the motor FM in operation after the starting switch ST is opened and until the feed motor cycle is completed. The four lobed cam TRC closes the contactor TRCC a first time to energize the tape reader solenoid TRS. The reader contacts are opened and the tape is stepped so that upon release of TRS its contacts are on the first row of information, i.e. that for panel X motion. It may be noted here that the reader contacts are closed when the reader solenoid is de-energized and remain closed until this solenoid is again energized to step the tape.

With the reader in the first reading position, the cam PXC then closes the contactor PXCC to energize the transfer relay PXR which, by means of its contacts 1 to 4 inclusive, connects the reader to the translating relays PXT. The appropriate PXT relays will operate in accordance with this tape code and store the information. The second lobe of the cam TRC then recloses the contactor TRCC to energize solenoid TRS to advance the tape to the next row of coded information. The cam PYC then closes the contactor PYCC to energize the transfer relay PYR which connects the reader to the translating relays PYT. The panel Y motion information is thus stored in the appropriate PYT relays. The PXT and PYT translating relays are locked up over a holding circuit through each of back contacts PX—2, PY—2, BX—3 and BY—2 in parallel via the lead 80. The third lobe of the cam TRC now recloses the contactor TRCC energizing the solenoid TRS to step the magnet to the third or B gun X motion information row. The cam BXC now closes the contactor BXCC to energize the relay BXYR which transfers the information via its contacts 1 to 4 inclusive for storage in the BXYT translating relays. These relays lock up over a circuit including the lead 81 and the back contact BX—4.

Since a second connection is to be made on the terminal c by the B gun, this information is on the fifth line of the reader as a punched hole. The information is transferred through the front contact BXYR—5, the lead 82, the back contact BX—2 and the lead 83 to energize the relay BZL. The BZL relay locks up over its front contact BZL—1, a circuit via lead 84 and back contact XYM—6. It may be noted here that if a second connection had been required on the terminal a, the relay AZL would have been operated by the contact PXR—5 at the time of transferring the panel X motion information. The relay AZL would lock up over the same circuit as that for the BZL.

The fourth lobe of the cam TRC now recloses the contacts TRCC to re-energize the reader solenoid TRS to step the tape to the fourth position or row which contains the B gun Y motion code information. There is no transfer of information to the BXYT relays, however, because the transfer relay BXYR is de-energized before the reader contacts reclose. The information is thus stored in the reader for transfer to the relays BXYT when required.

The motor control cam FC has now completed its cycle and transfers ground from the back contact FCC to the front contact FCC. This stops the motor FM and provides a ground for several relay locking circuits to be later described and also for the operating circuit of the relay XYP.

The cam BXC has sufficient dwell to keep the relay BXYR energized until the cam FC has transferred the ground connection to the noted XYP relay operating circuit. This circuit is over the lead 85 through the contact BXYR—6 to said ground over the lead 86. As previously noted the fourth lobe of the cam TRC has sufficient dwell to keep the reader contacts open until the transfer relay BXYR has opened its contacts.

During the just described cycle the feed rollers have fed a wire into the A and the B wrapping gun wiring heads AT and BT.

The relay XYP locks up through its front contact XYP—2 over the same locking circuit as the translating relays PXT and PYT, i.e. via lead 80 and the contacts PX—2, PY—2, PX—3 and BY—2 in parallel. The connection from the contact XYP—2 to the noted circuit is via the lead 87. Opening of the back contact XYP—1 opens a gap in the interlocking circuit between the starting switch ST and the motor FM.

Operation of the relay XYP energizes the B gun gripping solenoid BGS via its front contact XYP—3 to cause the B gun to grip the wire. Closure of the front contact XYP—5 puts ground on the common lead 90 to the translating relays PXT, PYT and PXYT. The front contact XYP—4 closes the circuit to the clutch operating solenoids PXS, PYS and BXS through the back contacts PX—3, PY—3 and BX—9 of the associated relays via the lead 101. The contact XYP—4 also closes the circuit of the motors PXM, PYM and BXM via the lead 101. The power supply to these motors, as well as to the motor BYM, is connected via the lead 107 through the presently closed back contact XYM—2 of the relay XYM. The power supply through the back contact XYM—2 is connected so that the motors run in a direction to move one selected terminal a to the A gun and the B gun to the other selected terminal c. This direction will be reversed for the return motion as later described.

The motors PXM, PYM and BXM are started and connected by their clutches simultaneously, but stop individually as each driven member reaches its destination. Since the panel X motion is to X=2, the PXM motor stops first. This occurs when the brush PXB reaches the segment 2 of commutator PXK, which has been connected to ground by the translating relays PXT. The connection is from ground through front contact XYP—5, the lead 90, the prepared chain of contacts in the PXT relays, the commutator segment 2, the brush PXB, the relay PX and through the power supply to ground. The relay PX operates and is locked up through its front contact PX—4, the lead 91, the back contact AZ—2, the lead 92 and the back contact FCC to ground.

Operation of the relay PX opens the back contact PX—3 to de-energize the clutch solenoid PXS and stop the panel motion in the X direction. The contact PX—2 opens with no present effect because it is one of the parallel contacts in the lock up circuit for the translating relays PXT and PYT and for the relay XYP. The contact PX—1 closes without present effect, it being one of serially connected contacts associated with the Z motion operation.

When the brush PYB reaches the segment 7 of its commutator PYK, a similar action takes place. The relay PY is energized and is locked up through its front contact PY—4 over the same circuit as for the PX relay. The contact PY—3 opens the circuit of the clutch solenoid PYS to stop the panel Y motion. Opening of the back contact PY—2 opens another of the parallel interlocks on the relays PXT, PYT and XYP and closing of the front contact PY—1 closes another link in the Z motion initiating circuit.

The brush BXB has meanwhile now connected with the segment 4 of the commutator BXK to energize the relay BX. Relay BX is locked up over its front contact BX—10 over the same circuit as for the PX and PY relays, i.e. via lead 91, AZ—2, lead 92 and FCC.

Operation of the relay BX opens the circuit of its clutch solenoid BXS by way of the back contact BX—9 stopping the B gun X motion. The back contact BX—8 opens another gap in the already open interlocking circuit between the starting switch ST and the motor FM. Closing of the front contact BX—7 closes one more serial gap in the Z motion control circuit.

The front contact BX—6 when closed re-energizes the transfer relay BXYR over the lead 95 to connect the reader again to the BXYT translating relays which have been de-energized by the opening of the back contact BX—4 over the lead 81. Closing of the front contact BX—5 energizes the clutch solenoid BYS and the motor BYM via contact BY—3 and lead 96 to connect and start said motor. The opening of the back contact BX—3 is without present effect since this is one of the parallel contacts in the locking circuit of the relays PXT, PYT and XYP.

Closing of the front contact BX—2 and opening of the back contact BX—2 transfers the connection through lead 82, BXYR—5 and TRS—5 from the lead 83 of relay BZL to the operating circuit of the stopping relay CSR via the lead 108 so that stopping information from line 5 of the tape may be transmitted as required along with the B gun Y motion information.

Closing of the front contact BX—1 puts an alternate ground in the operating circuit of the gripping solenoid BGS so that this solenoid will remain operated when the relay XYP is presently de-energized.

Then the brush BYB engages the segment 6 of the commutator BYK, the relay BY is energized to open the contact BY—3 to de-energize the solenoid BYS and the motor BYM, thereby stopping the B gun Y motion. The relay BY is locked up through its contact BY—4 and the previously noted circuit via lead 91 through the now closed contact AZ—2 and the lead 92 through the back contact FCC.

Opening of the back contact BY—2 opens the last gap in the lock up circuit of the translating relays PXT and PYT and of the relay XYP thereby de-energizing these relays. Closing of the front contact BY—1 closes a circuit which energizes the Z motion motors AZM and BZM. This circuit is from ground through front contacts PX—1, PY—1, BX—7, BY—1, back contacts XYM—1, AZ—1 and BZ—1 in parallel through the motors AZM and BZM and through the source to ground. The front contact BY—1 also closes a circuit to the solenoid BZS to shift the B gun Z motion cam 21b to a position opposite the small diameter of the follower 23b for a second wrap Z motion to the terminal c. The circuit is from ground via front contacts PX—1, PY—1, BX—7, BY—1 back contact XYM—1 the lead 97, front contact BZL—2 through the solenoid BZS and the source to ground.

The motors AZM and BZM by means of the previously described cam and follower means move both wiring guns toward the panel. The cams AZC and BZC on the cam shafts of these motors respectively control the extent of the Z motion cycle.

The cam AGC on the cam shaft of the motor AZM closes the contactor AGCC to operate the A gun gripping solenoid AGS to grip the wire. The mechanical cutter 29 operated from the AZM motor cam shaft cuts the wire. The cam DC closes the contactor DCC to operate the dresser solenoid DS or DS' depending upon which dresser is used. Then the cam WC closes the contactor WCC to energize the wrapping motors AWM and BWM and their respective clutch solenoids AWS and BWS. The dwell of the cams AZC and BZC is sufficient to allow time for the wrapping operation before the guns are retracted from the panel.

When the guns are fully retracted the cams AZC and BZC operate the associated relays AZ and BZ to open their back contacts AZ—1 and BZ—1 to de-energize the motors AZM and BZM. These relays are locked up via the respective front contacts AZ—4 and B2—3 through the back contact XYM—6 to ground. The front contacts AZ—3 and BZ—2 in series close a circuit to energize the relay XYM which locks up through its front contact XYM—7 over the lead 92 and the now closed back contact FCC to ground. Opening of the back contact XYM—6 de-energizes the AZ and BZ relays by opening the previously noted locking circuit.

Closure of the front contact XYM—8 prepares a grounding circuit for stopping the positioning motors as they reach the home position. The circuit is via the lead 98 to the B gun limit switches BXL and BYL and to the zero commutator contacts on the PXK and PYK commutators.

Opening of the back contact XYM—5 opens a gap in the interlocking circuit of the starting switch ST. This circuit is from the front contact of the switch ST through back contact XYP—1, lead 99, contact BX—8, XYM—5, the lead 100 to ground though the back contact FCC.

Closure of the front contact XYM—4 energizes the clutch solenoids PXS, PYS, and BXS through the back contacts PX—3, PY—3 and BX—9 of the corresponding relays and also energizes the motors PXM, PYM and BXM over the lead 101. The front contact XYM—3 when closed energizes the clutch solenoid BYS and the motor BYM through the now closed back contact BY—3. Closure of the front contact XYM—2 and the opening of the back contact XYM—2 reverses the power connection to the positioning motors so that they will operate to move the panel and the B gun in the homing direction.

Closure of the front contact XYM—1 and opening of the back contact XYM—1 transfers the circuit previously used for Z motion initiation to the motor FM in preparation for starting a new cycle if the relay CSR is unopened when the wiring cycle is completed. The circuit is from ground through front contacts PX—1, PY—1, lead 102, front contacts BX—7, BY—1, XYM—1, lead 103, back contact CSR—1 through the motor FM and the power source to ground.

The panel and B gun positioning motors drive the associated panel and gun to their home positions. When the brushes PXB and PYB reach the zero segment on their respective commutators, the relays PX and PY respectively are energized, opening their contacts PX—3 and PY—3 to de-energize the corresponding clutch solenoids PXS and PYS disconnecting these motors from the panel drive. Arrival of the B gun at the home position closes the limit switches BXL and BYL to operate the relays BX and BY to open the circuits of the solenoids BXS and BYS at the contacts BX—9 and BY—3 respectively disconnecting the B motor drives from the B gun. The motor BYM being in parallel with the solenoid BYS is also de-energized.

When all the relays PX, PY, BX, and BY have been energized in connection with stopping the positioning motors, there is a path from ground through PX—1, PY—1, lead 102, BX—7, BY—1, now closed front contact XYM—1, lead 103, back contact CSR—1 through the motor FM and the source to ground, which energizes the motor FM to start a new cycle. The cam FC opens the back contact FCC to de-energize the holding circuit of the relay XYM. On the other hand if the relay CSR has been energized by the switch CS or by tape information, the motor FM will not start until the starting switch is operated after the relay XYM has been de-energized as previously explained.

If a horizontal connection is to be made the code signal for the fourth reading position in the cycle i.e., B gun Y motion will be zero. The effect of this is to leave the translating relays BXYT in their normal or unoperated condition, which puts ground on the zero segment of the BYK commutator. The relay BY will thus be operated without any Y motion of the B gun taking place and the necessary connections for initiating Z motion will be made.

As used in this machine the wiring heads AT and BT are located with respect to the duct 26 so that the wire is fed into the wire receiving slots under the shank portions of the spindles back of the enlarged spindle ends. Thus the wire is displaced radially from the axial terminal receiving orifices in the spindles. Since the wiring tip orifices are in line with the terminals the wire is, due to this offset, always laid in the space between terminals when the guns are projected toward the panel.

It will be noted that in making right angle wire runs, which comprise a large percentage of the runs in the average wiring scheme, the wire is drawn at right angles around the shank of the spindle of the A gun between the enlarged head and the end of the retracted sleeve. The spindle shank is of sufficient diameter (about ⅛ inch for tools handling #24 gauge wire) to avoid undue friction on the wire. The pulling at right angles around the spindle tends to straighten the wire, however, so that it will lie properly between the terminal rows. The wire after the connection is made, is actually not absolutely straight but is bowed slightly in an arc having a very long radius. Thus, although the wire is straight enough to lie between two rows of terminals, it is bowed enough to rest lightly against some of the intervening terminals. The effect is similar to that of a slightly bowed spring lying longitudinally in a slot. The slight friction of the wire against these terminals aids in keeping the wire down between the terminals. Thus any tendency of the wire to fall away from the panel is inhibited.

What is claimed is:

1. An automatic wiring apparatus for applying and securing wire to spaced terminals on a panel, comprising a movable frame for supporting the panel, means for moving said frame horizontally and vertically in a plane parallel to the panel face, means for rotating said frame in said plane for rotating the panel to a selected one of four orientations in the wiring plane 90 degrees apart, and resilient means allowing movement of said frame perpendicular to said plane; a first and a second wiring device supported adjacent said frame, each independently movable along an axis perpendicular to said plane, in operation the first wiring device being stationary and the second wiring device being movable away from the first device in only a single sense in both the vertical and horizontal directions, means for moving each of said devices along said perpendicular axis; means for moving said second wiring device horizontally and vertically in a plane parallel to the panel face, and wire dressing means connected for vertical movement with said second wiring device; means for loading wire into said wiring devices, means adjacent said first wiring device for cutting the wire, and means coupled to the moving means of the first wiring device for operating said cutting means; and means connected to each wiring device for operating said device to secure a wire to the terminal when the device is positioned opposite the terminal to be connected.

2. A wiring apparatus as in claim 1 having means for vertically moving the wire dressing means independently of the vertical movement of said second wiring device.

References Cited in the file of this patent

UNITED STATES PATENTS

| | | |
|---|---|---|
| 1,677,133 | Ford | July 17, 1928 |
| 1,823,680 | Curtiss | Sept. 15, 1931 |
| 2,035,658 | Lewis | Mar. 31, 1936 |
| 2,535,770 | Livingston | Jan. 9, 1951 |
| 2,551,358 | Andren | May 1, 1951 |
| 2,637,096 | Luhn | May 5, 1953 |
| 2,649,121 | Reck | Aug. 18, 1953 |
| 2,649,122 | Mallina | Aug. 18, 1953 |
| 2,682,065 | Nelson | June 29, 1954 |
| 2,696,656 | Madden | Dec. 14, 1954 |